United States Patent [19]
Toth

[11] Patent Number: 5,630,954
[45] Date of Patent: May 20, 1997

[54] DIGITAL METER FOR CUTTING OR WELDING SYSTEM AND METHOD OF DISPLAYING DIGITAL DATA FOR SAME

[75] Inventor: Tibor E. Toth, Florence, S.C.

[73] Assignee: The ESAB Group, Inc., Florence, S.C.

[21] Appl. No.: 575,363

[22] Filed: Dec. 19, 1995

[51] Int. Cl.⁶ .................................................. B23K 9/095
[52] U.S. Cl. .............................. 219/130.01; 219/137 PS
[58] Field of Search ........................ 219/130.01, 130.31, 219/130.32, 130.33, 130.5, 130.51, 137 PS

[56] References Cited

U.S. PATENT DOCUMENTS

| 4,103,141 | 7/1978 | Wristen | 219/130.01 |
| 4,605,836 | 8/1986 | Retfalvi et al. | 219/130.01 |
| 5,278,390 | 1/1994 | Blankenship | 219/130.5 |
| 5,343,016 | 8/1994 | Davis et al. | 219/130.5 |

FOREIGN PATENT DOCUMENTS

| 2917540 | 11/1980 | Germany | 219/130.01 |
| 59-76672 | 5/1984 | Japan | 219/130.01 |

OTHER PUBLICATIONS

ESAB Welding & Cutting Products, *Instruction Manual, VI 450 Welding Power Source*, F-15-098-A, Mar. 1995.
L-TEC Welding & Cutting Systems, *Instructions for L-TEC 450 Welding Power Supply*, P/N 678530, F-12-961-B, Oct. 1990.

*Primary Examiner*—Clifford C. Shaw
*Attorney, Agent, or Firm*—Bell, Seltzer, Park & Gibson

[57] ABSTRACT

An apparatus and method for displaying data to a user of a cutting or welding system is provided. The apparatus preferably has an arc torch including at least an electrode having an arc discharge end and means for creating an electrical arc extending from the electrode to a workpiece and a cutting or welding power source operatively connected to the arc torch for supplying power to the arc torch. The cutting or welding power source preferably includes a power circuit having an electrical input line positioned to receive power from an external power supply, a transformer having a primary side connected to the input line and a secondary side, a rectifier connected to the secondary side of the transformer, and an output line connected to the rectifier. The power source also has a sensor connected to the secondary side of the transformer for sensing an electrical signal representative of at least either a voltage level or a current level, a digital display positioned to display digital data to a user of a cutting or welding system, and a display controller operatively connected to the sensor and the digital display for controlling the digital display responsive to the sensor. The display controller preferably includes a sampler responsive to the sensor for sampling a predetermined number of electrical signals representative of voltage and current and an averager responsive to the sampler for averaging the predetermined number of samples.

16 Claims, 5 Drawing Sheets

DIGITAL METER FOR CUTTING OR WELDING SYSTEM AND METHOD OF DISPLAYING DIGITAL DATA FOR SAME

FIELD OF INVENTION

This invention relates to a cutting or welding apparatus and, more particularly, to an apparatus and method for displaying digital data in a cutting or welding system.

BACKGROUND OF THE INVENTION

Various industrial and commercial cutting and welding systems (e.g., electric arc welders) are generally well known. These systems conventionally include a cutting or welding arc torch and a cutting or welding power source electrically connected to the torch for supplying electric power thereto. These cutting or welding systems, for example, include electroslag or stick electrode welders, Metal-Inert Gas ("MIG") welders, and Tungsten-Inert Gas ("TIG") welders and include manual and automated cutting or welding systems. For example, in a conventional automated cutting or welding system, one or more arc torches (e.g., cutting torch, welding torch, plasma arc torch) are often supported on a frame bridge and carriage system. A drive, i.e., motor, moves the arc torches along X-Y-Z coordinates during the cutting or welding of a workpiece positioned beneath the torch. A controller (e.g., preferably including a microprocessor), which usually includes a numerical control operating system, provides precise control over the position, movement, and acceleration of the torch to enable precision cutting or welding of the workpiece.

During initial setup for system operation, the system operator preferably presets the amount of cutting or welding current and the amount of gas and water flow into the torch. During system operation, for example, the power source generates a cutting or welding current to an electrode of the torch, a flow of gas is generated between the electrode and a nozzle assembly of the torch, and an electrical arc is generated extending from the electrode through a bore of a nozzle assembly of the torch into contact with a workpiece positioned beneath the nozzle assembly. The operator then manually adjusts the cutting or welding current to compensate for load changes which occur through process parameter changes such as changes in plate thickness, changes in plasma gas flow, changes in the distance from the plate to the torch, and changes in the gas and water flows into the torch.

Additionally, in such cutting or welding systems, the power source, for example, may conventionally include an input line which is connected to a conventional external supply of electric power, such as household or industrial alternating current. The power source also includes two terminals at the output side to assist in forming the cutting or welding arc. One of the terminals is connected to the welding or cutting torch, and the other terminal is connected to the workpiece to complete or close a circuit with the power source. The power source may have an analog meter associated with the power source for setting or adjusting the arc voltage from the power source. Additionally, analog displays are often associated with the power source, but are often difficult to read in various ambient environments and at distances greater than a few inches away. These analog displays also often make precise adjustments to the voltage level difficult. Accordingly, there is a need for a cutting or welding system which solves the various problems associated with the conventional current and voltage meters such as associated with a cutting or welding power source. Further, there is a need to provide more data about the operational status during various stages of a cutting or welding operation, more digital control for various cutting or welding operations, and more simplified and less expensive controls of cutting or welding systems.

SUMMARY OF THE INVENTION

The above needs are met and other advantages are accomplished by the provision of a digital meter for a cutting or welding system according to the embodiments of the present invention. The digital meter according to the present invention preferably is operatively mounted to a cutting or welding power source of a cutting or welding system so that an operator of the system can readily view the display from a greater distance and view operational status during various stages of a cutting or welding operation. The digital controls of the meter advantageously provide greater accuracy in a relatively less complex and less expensive manner.

More particularly, an apparatus for displaying data to a user of a cutting or welding system is provided that preferably has a cutting or welding torch (e.g., an arc torch) and a cutting or welding power source operatively connected to the arc torch for supplying power to the torch. The cutting or welding power source according to the present invention preferably includes at least a power circuit having an electrical input line positioned to receive power from an external power supply, a transformer having a primary side connected to the input line and a secondary side, a rectifier connected to the secondary side of the transformer, and an output line connected to the rectifier. The power source also preferably has a sensor operatively connected to the secondary side of the transformer for sensing an electrical signal representative of at least either a voltage level or a current level, a digital display positioned to display digital data to a user of a cutting or welding system, and a display controller (e.g., preferably including a microprocessor) operatively connected to the sensor and to the digital display for controlling the digital display responsive to the sensor. The display controller preferably includes a sampler operatively responsive to the sensor for sampling a predetermined number of electrical signals representative of either voltage or current and an averager operatively responsive to the sampler for averaging the predetermined number of samples.

The present invention also provides a method of displaying data on a digital display for a cutting or welding system. The method preferably includes sampling an electrical signal representative of a voltage level a predetermined number of times, sampling an electrical signal representative of a current level a predetermined number of times, averaging the sampled voltage levels and the sampled current levels, and communicating the average voltage level and the average current level to the digital display of a welding system for display thereon.

BRIEF DESCRIPTION OF THE DRAWINGS

Some of the features and advantages of the present invention having been stated, others will become apparent as the description proceeds when taken in conjunction with the accompanying drawings, in which.

DETAILED DESCRIPTION

The present invention now will be described more fully hereinafter with reference to the accompanying drawings in which illustrated embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 1:
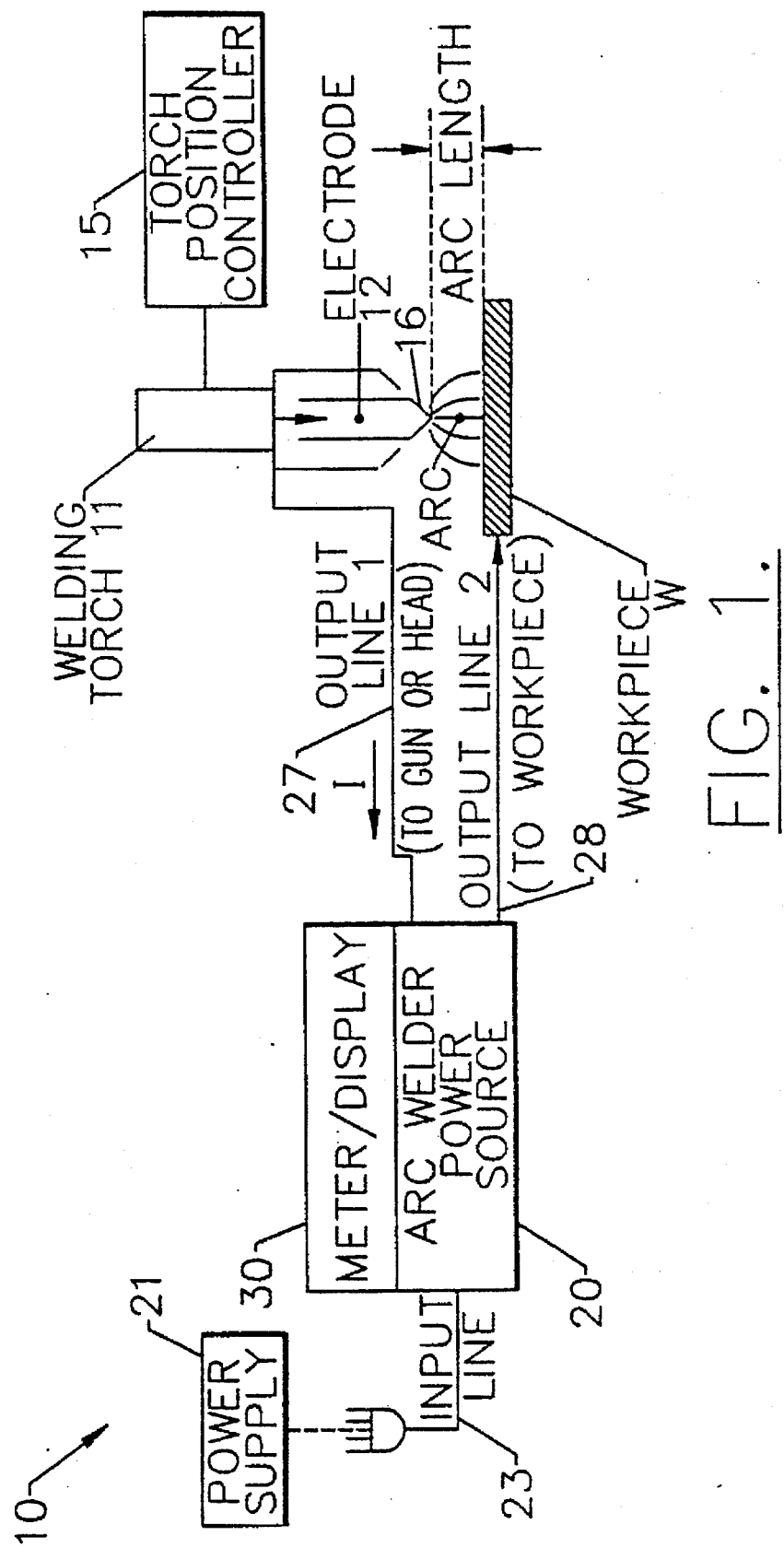
FIG. 1 illustrates a schematic view of a cutting or welding system which includes a digital meter for a power source of a cutting or welding system according to an embodiment of the present invention.

FIG. 1 schematically illustrates a cutting or welding system 10 according to an embodiment of the present invention. As understood by those skilled in the art, the cutting or welding system 10 preferably has at least a cutting or welding torch (e.g., an arc torch) 11 preferably including at least an electrode 12 having an arc discharge end 16. The torch 11 may also include means (e.g., switch or plasma gas flow) for creating an electrical arc extending from the electrode to a workpiece W, e.g., arc length $L_{Arc}$, and a cutting or welding power source 20 operatively connected to the electrode 12 of the arc torch 11 for supplying power to the arc torch 11. An arc torch position controller 15 as also understood by those skilled in the art may also be operatively connected to the torch 11 for controlling the position of the torch 11 for cutting or welding operations in a relatively automated manner. The torch position controller 15 provides precise control over the position, movement, and acceleration of the torch to enable precision cutting or welding of a workpiece W. It will also be understood by those skilled in the art, however, that the manual control of the torch is also included by the concepts of the present invention.

Figure 2A:
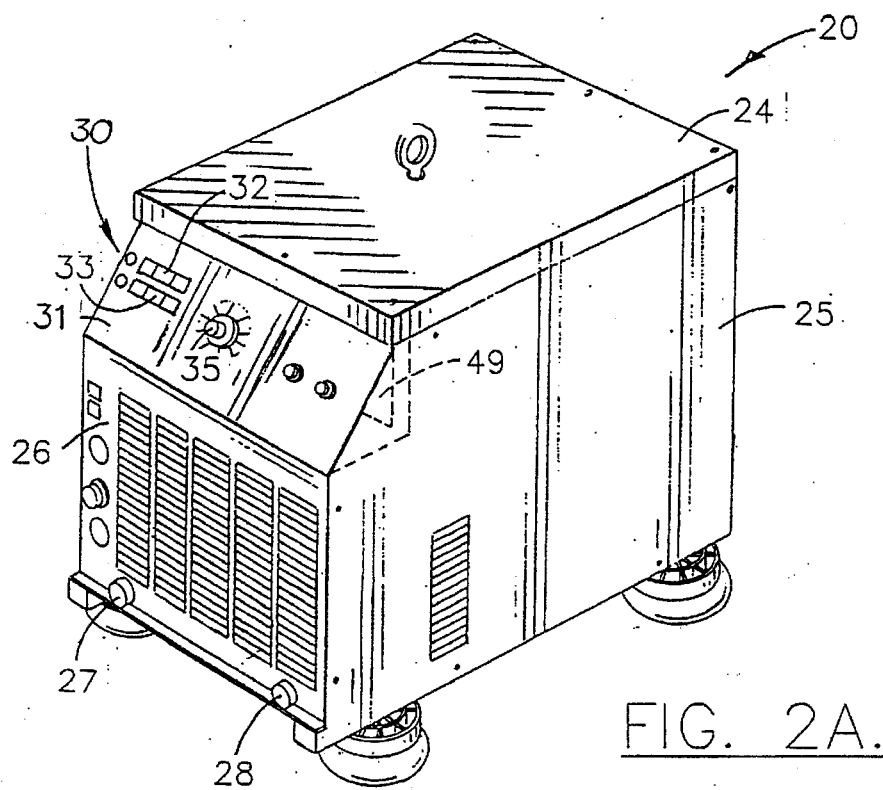
FIG. 2A illustrates a perspective view of a digital meter of a power source for a cutting or welding system according to an embodiment of the present invention.

As best illustrated in the perspective view of FIG. 2A, the power source 20 of the cutting or welding system 10 according to an embodiment of the present invention preferably includes several removable cover panels 24, 25, 26 which enclose the various components of the power source 20 to form a housing H. Either mounted to extend adjacent, formed integral with, or mounted through the front cover panel 26, the power source 20 also preferably includes a group of intake vents and various switches, controls, instruments, and terminals related to the power source 20. The power source 20 preferably includes at least one or more voltmeters or ammeters defining a digital meter 30, which have a digital display 32, 33, to inform the operator about the condition of the cutting or welding power. The front cover 31 of the digital meter 30 may also include several resettable circuit breakers 37, 38, a voltage output control knob 35, and output terminals 27, 28 for connecting cables to the welding electrodes 21, 22. For example, large pushing or pulling forces may be applied to these terminals 27, 28 by the operator when connecting the electrode cables to the workpiece W and to the torch 11, and, accordingly, it is preferable that the terminals 27, 28 be rigidly mounted to the power source 20.

Figure 2B:
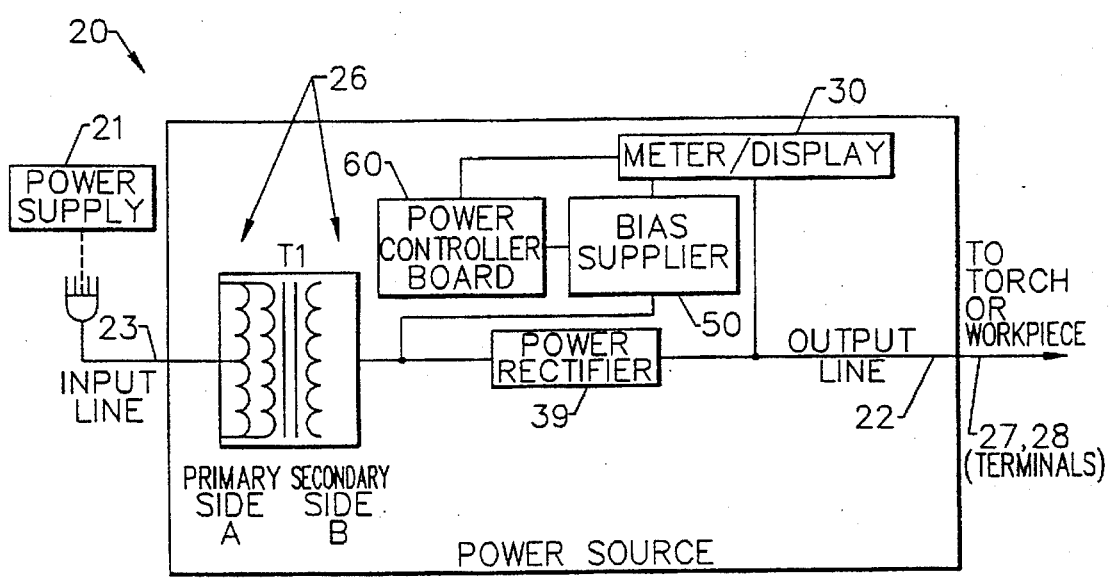
FIG. 2B illustrates a schematic block diagram of a power source having a digital meter for a cutting or welding system according to an embodiment of the present invention.
Figure 2C:
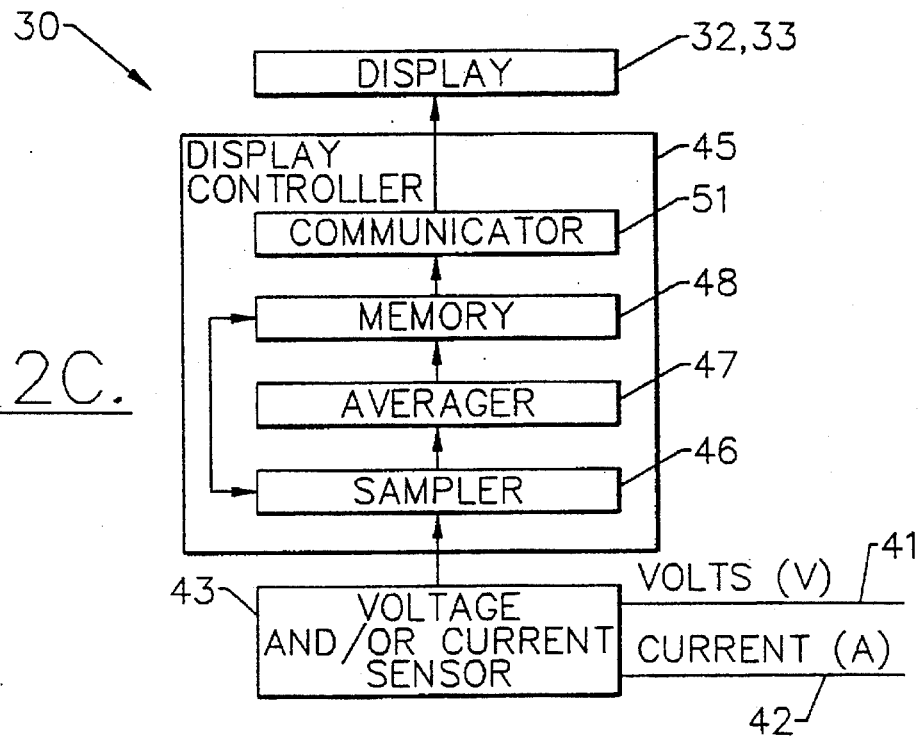
FIG. 2C illustrates a schematic block diagram of a digital meter of a power source for a cutting or welding system according to an embodiment of the present invention.

The cutting or welding power source 20 according to the invention and as illustrated includes a power circuit 26 (see FIG. 2B) having various electrical components supported on a frame as illustrated in FIGS. 2A and 2B. In particular, the power circuit 26 preferably includes an electrical input line 23 which is operatively connected to an external power supply 25 such as conventional alternating household or industrial supply current. The input line 23 preferably is also operatively connected to a changeover terminal board (not shown) which allows for supply currents of various voltages and phase configurations to be used, which is especially useful, for example, when the welder power source 20 is used in countries having different current levels supplied from the power supply 25. Various connectors on the changeover terminal board are preconfigured depending on the supply current used to ensure the proper voltage and current levels at the output terminals 27, 28 of the power source 20.

The supply current from the external power supply 25 is passed from the changeover terminal board to a transformer T1. As understood by those skilled in the art, the electrical components of the power circuit 26 leading to the transformer T1 are considered to be on the primary side of the transformer T1, whereas the electrical components downstream of the transformer T1 are considered to be on the secondary side. The transformer T1 transforms the high voltage-low amperage supply current on the primary side to a low voltage-high amperage current on the secondary side, which is more desirable for cutting or welding operations.

The current from the secondary side of the transformer T1 is then passed to a rectifier or a rectifier circuit 39, where it is converted from alternating current to direct current. As understood by those skilled in the art, the rectifier 39 preferably includes one or more thyristors in operative connection with one or more heat sinks. The thyristors, which are preferably silicon-controlled rectifiers (SCR), generate large amounts of heat when rectifying the current and direct that heat to the heat sinks. The heat sinks (not shown) preferably include a piece of heat-conductive metal, such as aluminum, provided with a plurality of vanes which increase the surface area of the heat sink and improve convective heat transfer to the ambient air.

From the rectifier 39, the current is passed to one or more devices for smoothing out the voltage signal. In particular, the current preferably is passed through a filter or filtering circuit such as a bank of capacitors and/or an inductor which create a more uniform direct current. The current may also be passed through one or more resistors. The current is then passed to an output line 22, i.e., arc voltage output, which is connected to one of the output terminals 27, 28 mounted adjacent to the front cover panel 26.

Figure 3:
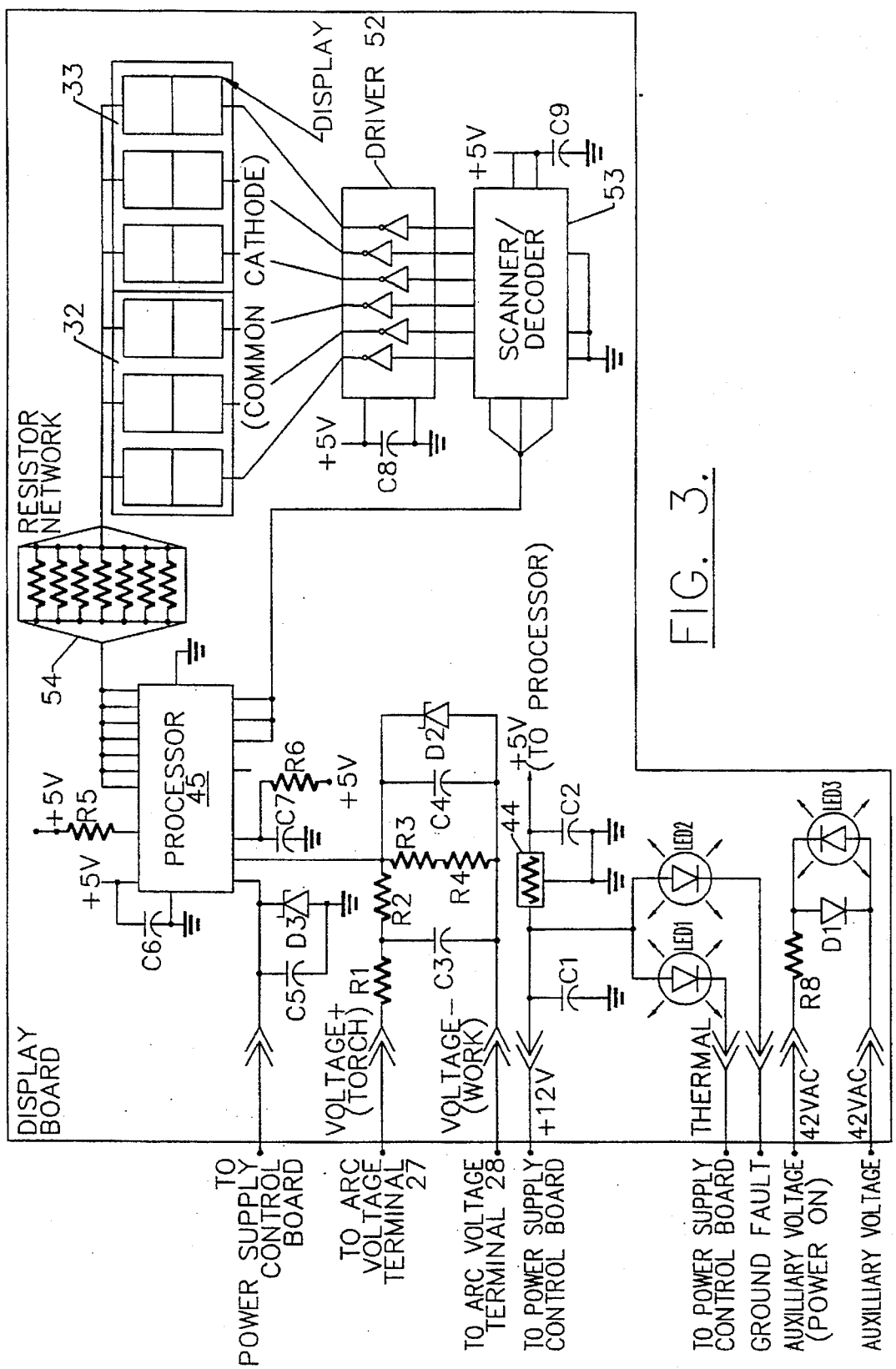
FIG. 3 illustrates a schematic view of a digital meter for a power source of a cutting or welding system according to an embodiment of the present invention.

As further illustrated in FIGS. 2B and 3, a voltage sensor 43a preferably is operatively connected to the output line 22 for sensing an electrical signal representative of a voltage level. The voltage sensor 43a preferably includes an RC circuit (R1, R2, R3, R4, C3, C4, and diode D2) network operatively connected to the arc voltage output lines for the torch 11 and the workpiece W and for filtering the voltage signal before passing it to a processor 45. A current sensor 43b is operatively connected to the secondary side of the transformer T1, and preferably to the output of a shunt amplifier preferably connected to a power source control board 60, for sensing an electrical signal representative of a current level. As understood by those skilled in the art, although having both a voltage sensor and a current sensor are preferable, having one or more sensors operatively connected to the secondary side of the transformer T1 for sensing an electrical signal representative of at least either a voltage level or a current level may be used as well according to the present invention. The sensors 43 are preferably operatively connected to provide a type of continuous monitoring of the voltage and/or current level during operation of the power source 20. A user or operator interface such as a control knob (e.g., potentiometer) as illustrated in FIG. 2A may also be used to set and/or adjust the arc voltage. The current level, however, preferably is not set or controlled by a user interface, but is a continuous measure or meter for current until a hold status occurs.

A digital display 32, 33 is positioned to display digital data representative of the voltage level and the current level. The display 32, 33 preferably includes a predetermined plurality of segmented light emitting diode display units, e.g., six display units are illustrated (FIG. 3), mounted to a display board 49 for displaying the voltage level (e.g., three display units) and a corresponding predetermined plurality of segmented light emitting diode display units (e.g., three display units) for displaying the current level. A display controller 45 is operatively connected to the voltage and current level sensors 43 and to the digital display 32, 33 for controlling the digital display 32, 33 responsive to the sensors 43. The display controller 45 preferably includes a microprocessor as illustrated and also is preferably mounted to the display board 49. The microprocessor 45 preferably has a relatively small amount of memory or RAM (e.g., less than 64 bytes) to reduce the complexity, size, and expense of the digital meter according to the present invention.

The display controller 45 (see FIG. 2B) preferably is formed of a combination of hardware and software as understood by those skilled in the art. The display controller 45 preferably includes a sampler 46 responsive to the voltage and current sensors 43 for sampling a predetermined number of electrical signals representative of a voltage level and a current level and an averager 47 responsive to the sampler 46 for averaging the predetermined number of samples to display to an operator of the cutting or welding system 10. The display controller 45 further includes a memory 48, such as the random access memory ("RAM") of the microprocessor, operatively connected to the averager 47 for storing data representative of voltage and current levels. A communicator 51 preferably is operatively connected to the memory 48 (i.e., may also be connected to other elements of the controller 45 such as the averager 47) for communicating data representative of the average sampled voltage and the average sampled current to the digital display 32, 33. The communicator 51 preferably includes a decoder 53 operatively connected to the memory 48 for decoding data representative of voltage and current levels and a display driver 52 for driving at least portions of the display 32, 33 with a predetermined current so that the display indicates numeric representations of the current level and the voltage level to an operator of the system 10. A resistor network 54 operatively connected to the processor 45 and the display 32, 33 may be used to assist in the scanning and/or driving of the display 32, 33.

As best illustrated in FIG. 3, the digital meter 30 also preferably includes a ground fault and/or thermal indicating circuit 49 positioned to detect a ground fault and sense temperature conditions from the power source control board 60 and indicate the ground fault and sense temperature conditions to an operator through a pair of light emitting diodes LED1, LED2. The meter 30 also has an adjustable voltage regulator circuit 44 which includes a pair of capacitors C1, C2, and an adjustable voltage regulator 44 operatively connected to the power control board 60 and to the processor 45, for adjustably regulating the voltage (e.g., +12 V) from the power source control board 60. An indicator (LED3) may also be used for indicating the "power on" status to an operator. The indicator (LED3) preferably is connected to an auxiliary voltage switch and includes drive circuitry (Resistor RS, diode D1).

Figure 4:
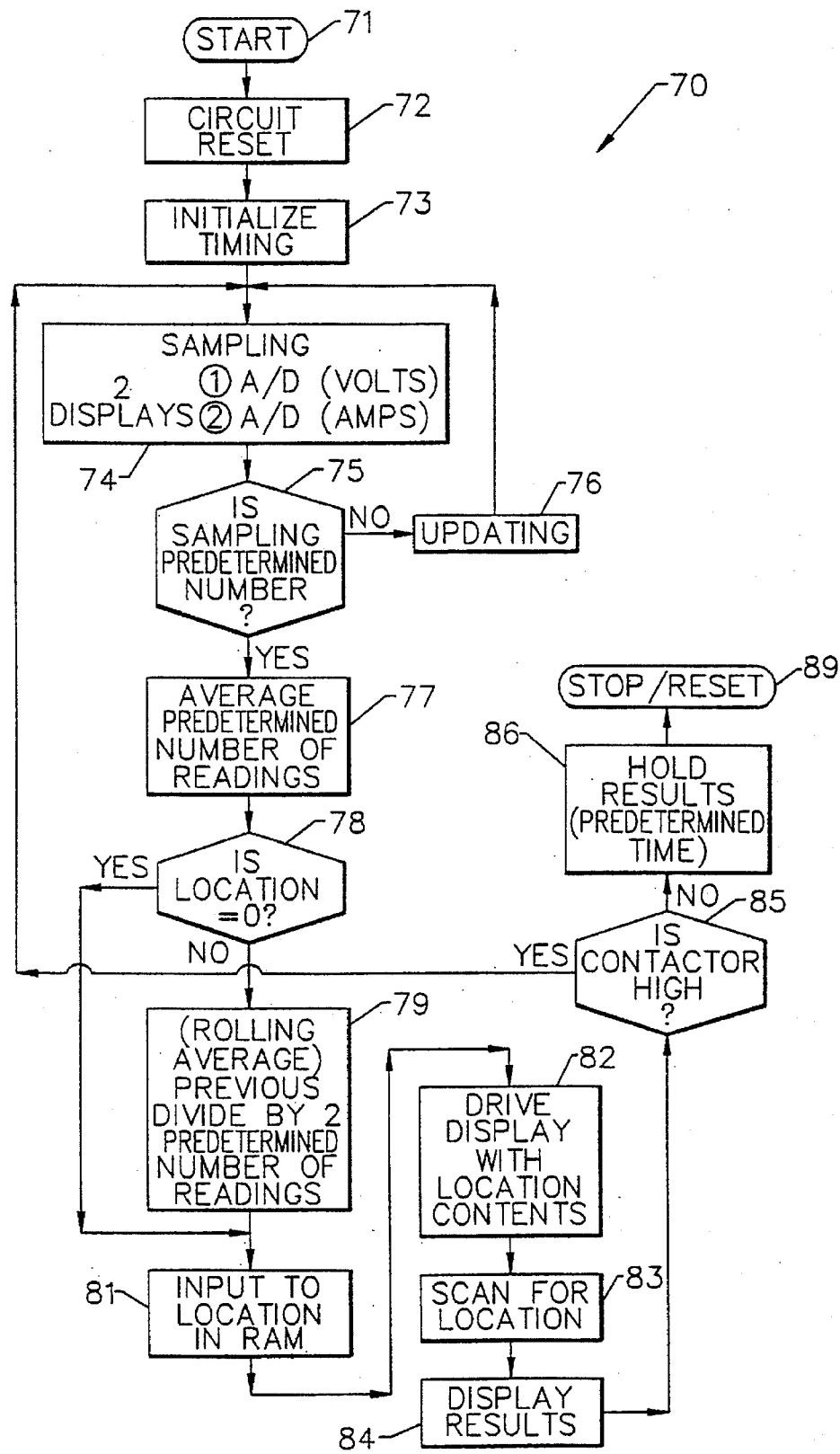
FIG. 4 illustrates a schematic block diagram and method of displaying digital data for a digital meter of a power source of a cutting or welding system according to an embodiment of the present invention.

The present invention further preferably includes a method of displaying data on a digital display 32, 33 for a cutting or welding system 10 (see FIGS. 3–4). The method preferably includes sampling 74 an electrical signal representative of a voltage level a predetermined number of times, sampling 74 an electrical signal representative of a current level a predetermined number of times, averaging 77 the sampled voltage levels and the sampled current levels, and communicating data representative of the average voltage level and the average current level to the digital display 32 of a cutting or welding system 10 for display thereon. Data representative of the average voltage and current levels are also preferably stored in the memory 48 of the controller 45 prior to communicating the levels to the display 32, 33. The step of communicating data to the display 32, 33 preferably includes decoding 79 the data and driving 82 the display 32, 33 so that the data are readily represented in a numeric format to an operator of the system 10.

More particularly, FIGS. 3 and 4 illustrating starting 71 a software routine programmed into the processor 45 so that the display circuits are reset 72 and the timing initialized. Because the display 32, 33 includes a voltage display 32 and a current display 33, the voltage level and current level are each alternatively or interleavingly sampled 74 a predetermined number of times, e.g., preferably about 8 times. If the sample cycle is not equal to the predetermined number, then the count or sample is updated 76 and the sample cycle continues. If the sample count is equal to the predetermined number, then the average 77 of these readings is determined, i.e., total of voltage level of all samples divided by the total number of samples. This sample is compared to the last reading and divided by two (2) 79 so that a rolling type of average is determined.

If the last sampled average reading was zero 78, then the rolling average is not determined and the most recently sampled average is decoded, e.g., binary coded decimal format, and input 81 into the memory 48 of the processor 45. The display 32, 33 is driven 82 with the location contents and is scanned 83 for the position of the next number for displaying the results 84 to an operator. This continues as long as the contactor is high 85, but holds 86 the display 32, 33 contents if the contactor is removed, e.g., to evaluate readings.

In the drawings and specification, there have been disclosed typical preferred embodiments of the invention, and, although specific terms are employed, they are used in a generic and descriptive sense only and not for the purposes of limitation. The invention has been described in considerable detail with specific reference to various preferred embodiments. It will be apparent, however, that various modifications and changes can be made within the spirit and scope of the invention as described in the foregoing specification and defined in the appended claims.

That which is claimed is:

1. A cutting or welding system which displays data to a user thereof, the system comprising:

an arc torch including at least an electrode having an arc discharge end and means for creating an electrical arc extending from the electrode to a workpiece; and a cutting or welding power source operatively connected to said arc torch for supplying power to said arc torch, said power source including at least a power circuit comprising an electrical input line positioned to receive power from an external power supply, a transformer having a primary side connected to said input line and a secondary side, a rectifier operatively connected to the secondary side of said transformer, and an output line connected to said rectifier, a sensor operatively connected to the secondary side of said transformer for sensing an electrical signal representative of either a voltage level or a current level, a digital display positioned to display digital data representative of at least either the voltage level or the current level, and a display controller operatively connected to said sensor and said digital display for controlling said digital display responsive to said sensor, said display controller including a sampler responsive to said sensor for sampling a predetermined number of electrical signals representative of either a voltage level or a current level and an averager responsive to said sampler for averaging the predetermined number of samples to display to an operator of the cutting or welding system.

2. An apparatus as defined in claim 1, wherein said power source further includes a display board having said digital display mounted thereto, and wherein said display controller of said power source includes a microprocessor having less than 64 bytes and being mounted to said display board.

3. An apparatus as defined in claim 1, wherein said display controller further comprises a memory operatively connected to said averager for storing data representative of voltage and current levels and a communicator for communicating data representative of at least either the average sampled voltage or current to the digital display.

4. An apparatus as defined in claim 3, wherein said communicator includes a decoder operatively connected to said memory for decoding data representative of either voltage or current levels and a display driver for driving at least portions of said display with a predetermined current.

5. An apparatus as defined in claim 1, wherein said digital display comprises a predetermined plurality of segmented light emitting diode display units for displaying the average sampled voltage and a corresponding predetermined plurality of segmented light emitting diode display units for displaying the average sampled current.

6. A cutting or welding system which displays data to a user thereof, the system comprising:

an arc torch including at least an electrode having an arc discharge end and means for creating an electrical arc extending from the electrode to a workpiece; and a cutting or welding power source operatively connected to said arc torch for supplying power to said arc torch, said power source including at least a power circuit comprising an electrical input line positioned to receive power from an external power supply, a transformer having a primary side connected to said input line and a secondary side, a rectifier operatively connected to the secondary side of said transformer, and an output line connected to said rectifier, a sensor operatively connected to said output line for sensing an electrical signal representative of a voltage level and an electrical signal representative of a current level, a digital display positioned to display digital data representative of the voltage level and the current level, and a display controller operatively connected to said voltage and current level sensor and said digital display for controlling said digital display responsive to said sensor, said display controller including a sampler responsive to said sensor for sampling a predetermined number of electrical signals representative of a voltage level and a current level, an averager responsive to said sampler for averaging the predetermined number of samples, and a memory operatively connected to said averager for storing data representative of voltage and current levels to be displayed to an operator of the cutting or welding system.

7. An apparatus as defined in claim 6, wherein said display controller further includes a decoder operatively connected to said memory for decoding data representative of voltage and current levels and a display driver for driving at least portions of said display with a predetermined current.

8. An apparatus as defined in claim 7, wherein said digital display comprises a predetermined plurality of segmented light emitting diode display units for displaying the average sampled voltage and a corresponding predetermined plurality of segmented light emitting diode display units for displaying the average sampled current.

9. A power source for a cutting or welding system which displays data to a user thereof, the power source comprising:

a power circuit comprising an electrical input line positioned to receive power from an external power supply, a transformer having a primary side connected to said input line and a secondary side, a rectifier connected to the secondary side of said transformer, and an output line connected to said rectifier;

a voltage sensor operatively connected to said output line for sensing electrical signals representative of a voltage level;

a current sensor operatively connected to the secondary side of said transformer for sensing electrical signals representative of a current level;

a digital display positioned to display digital data to a user of the power source; and a display controller operatively connected to said voltage and current level sensors and to said digital display for controlling said digital display responsive to said sensors, said display controller including a sampler responsive to said sensors for sampling a predetermined number of electrical signals representative of voltage and current and an averager responsive to said sampler for averaging the predetermined number of samples to display to an operator of the power source.

10. A power source as defined in claim 9, further comprising a display board having said digital display mounted thereto, and wherein said display controller includes a microprocessor having less than 64 bytes and being mounted to said display board.

11. A power source as defined in claim 10, wherein said display controller further comprises a memory operatively connected to said averager for storing data representative of voltage and current levels and a communicator for communicating data representative of the average sampled voltage and current to the digital display.

12. A power source as defined in claim 11, wherein said communicator includes a decoder operatively connected to said memory for decoding data representative of voltage and current levels and a display driver for driving at least portions of said display with a predetermined current.

13. A power source as defined in claim 12, wherein said digital display comprises a predetermined plurality of segmented light emitting diode display units for displaying the average sampled voltage and a corresponding predetermined plurality of segmented light emitting diode display units for displaying the average sampled current.

14. A method of displaying data on a digital display for a cutting or welding system comprising:

sampling an electrical signal representative of a voltage level a predetermined number of times;

sampling an electrical signal representative of a current level a predetermined number of times;

averaging the sampled voltage levels and the sampled current levels; and communicating data representative of the average voltage level and the average current level to the digital display of a welding system for display thereon.

15. A method as defined in claim 14, further comprising storing the average voltage level and the average current level.

16. A method as defined in claim 14, wherein the communicating step includes the steps of decoding data responsive to the average voltage and current levels and driving the digital display so that the average voltage and current levels are displayed thereon.

* * * * *